Patented June 28, 1932

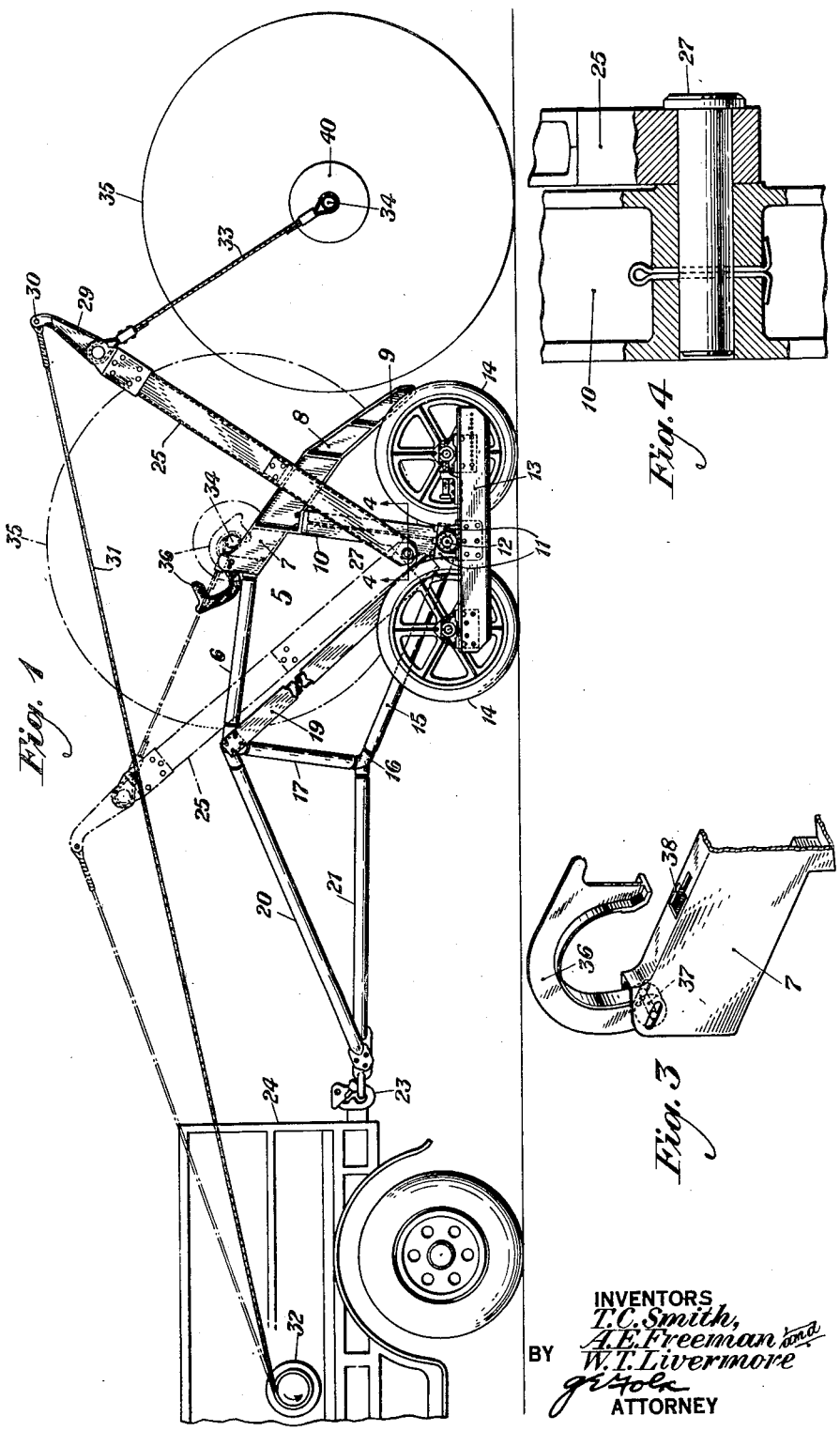

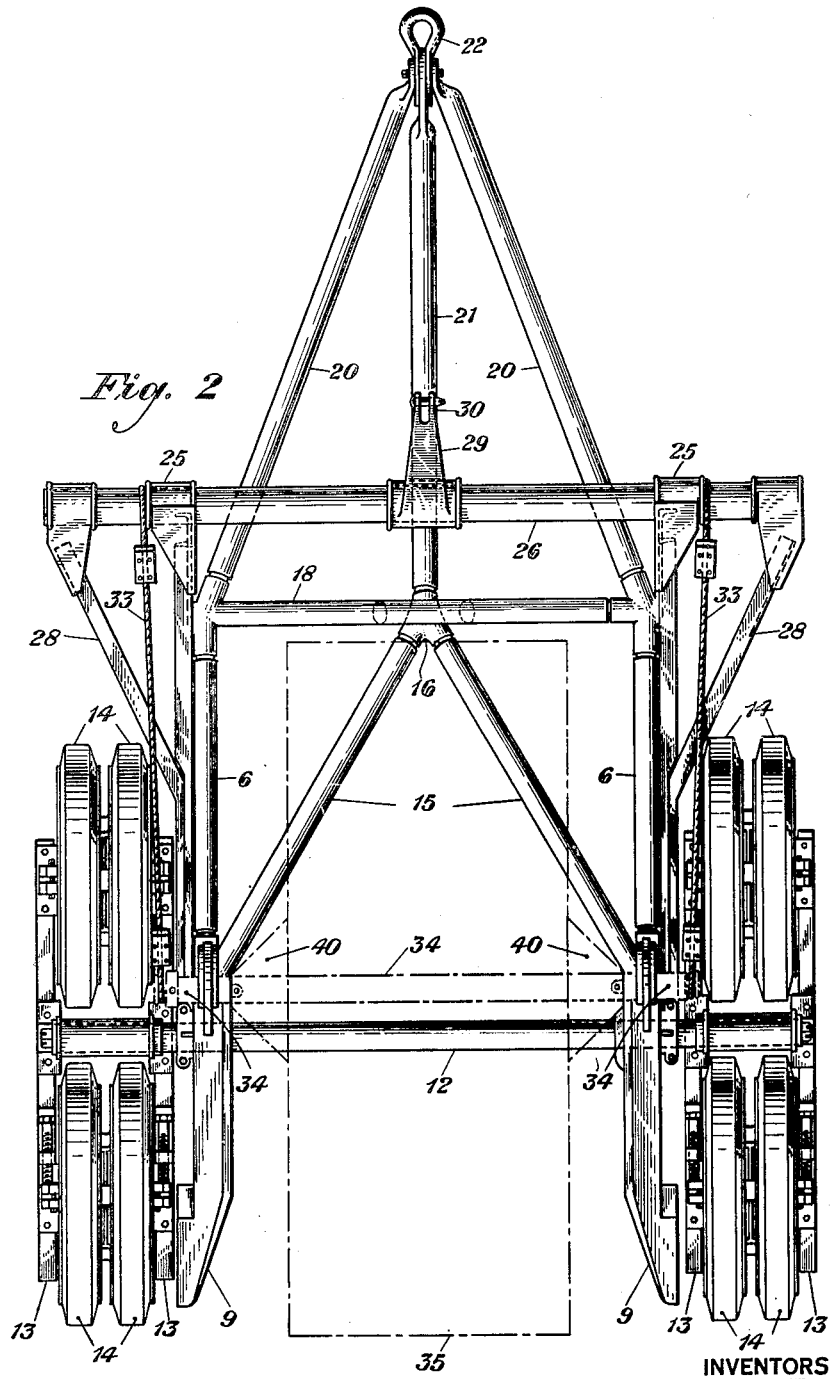

1,864,676

UNITED STATES PATENT OFFICE

TEMPLE C. SMITH, OF WESTFIELD, ALBERT E. FREEMAN, OF EAST ORANGE, AND WILLIAM T. LIVERMORE, OF WESTFIELD, NEW JERSEY, ASSIGNORS TO AMERICAN TELEPHONE AND TELEGRAPH COMPANY, A CORPORATION OF NEW YORK

CABLE REEL TRAILER

Application filed March 23, 1931. Serial No. 524,728.

This invention relates to trailers, and more particularly to devices of this character which are adapted to be used in connection with the loading, transporting and unloading of cable reels.

One of the objects of the invention consists in the provision of mechanism pivotally mounted on the trailer by which cable reels are loaded and unloaded.

Another object consists in the provision of locking mechanism by which the cable reel is held in mounted position on the trailer.

These and further objects will be apparent from the following description when considered in connection with the accompanying drawings, in which one embodiment of the invention is illustrated.

In the drawings, Figure 1 is a side elevation of the trailer; Fig. 2 is a plan view thereof; Fig. 3 is a perspective view of the locking mechanism detail; and Fig. 4 is a section taken on line 4—4 of Fig. 1.

Referring to the drawings in which the improved device is illustrated, the reference 5 is applied to the main frame or body portion. The main frame which may be made substantially throughout of metal tubing or the like includes parallel side members 6, 6. The members 6, 6 are each connected at their rear ends to a saddle portion 7 formed on inclined side frame members 8. These members provide parallel tracks upon which a supporting spindle, which extends beyond the sides of a cable reel, is carried in the loading and unloading operations of the reel, as will be later described. The members 8, 8 have rearwardly positioned flared portions 9, 9 which serve as guides for the trailer as it is backed into a cable reel.

A substantially vertical support 10 is provided for each of the track frame members 8, and is suitably secured at its top to the lower side of the members 8, as more clearly shown in Fig. 1. The bottoms of the supports 10 are carried by cooperating yoke portions 11 which are attached on each side of the main frame to the axle 12. The ends of the axle are journaled to the approximate center of a pair of parallel horizontal rocker bars 13 positioned on each side of the trailer. Wheels 14 are journaled between each pair of the rocker bars 13 near the ends thereof. The ends of the axle 12, as more clearly shown in Fig. 2, will lie between these wheels. The rocker bars being pivoted in the manner indicated, with the wheels positioned on the ends of the rocker bars, permit the wheels to rise and fall independently and compensate for irregularities in the ground surface. The wheels are adapted to have a track assembly or caterpillar attachments applied thereto if desired, and may be provided with elements by which the distance between them may be adjusted.

The main frame 5 is shown as having a lower portion including forked arms 15 which are attached at their rear extremities to the yokes 11 and are brought together at their forward extremities at a junction point 16. Forked arms 17 extend upwardly from the junction 16 and are suitably connected to a transverse bar 18 which joins the parallel side members 6, 6 of the upper portion of the framework together. A side brace arm 19 extends from each of the supports 10 to the outside of the members 6 at a point where the transverse member 18 is connected. A tongue portion for the trailer may be provided by forked arms 20, 20 and by an arm 21. The forward ends of the arms 20, 20 and the arm 21 are suitably bolted together, and carry a ring 22 by which the trailer may be joined by means of some such coupling arrangement as is shown at 23 to an attachment on a tractor or truck 24. The arms 20 are connected at their rear extremities to the joints formed by the ends of the transverse bar 18 and the side members 6, 6, and the rear extremity of the arm 21 is connected to the junction point 16.

It will be noted that the tongue portion including the members 20 and 21 form a truss structure substantially in the form of a pyramid. The base of the pyramid is formed by the members 17, 17 and 18. This structure provides a maximum amount of strength and rigidity with a minimum amount of weight and material. The tongue structure is so formed that it will lie above a straight line drawn between the axle 12 and the towing connection 23, thereby providing sufficient ground clearance for passing over embankments or other obstructions.

A loading frame is pivotally connected to the main frame 5 and includes a yoke having side arms 25 and a transverse bar which interconnects the upper extremities of said arms. The loading frame, as may be seen in Fig. 4, is pivotally connected at the lower ends of its arms 25 to the uprights 10 by means of pins 27 which pass through apertures in the arm 25 and the uprights 10, and a cotter pin or the like may pass through the uprights and pins to maintain the latter in place. Reinforcing braces 28 may be provided for the arms 25, and these braces may extend, as shown in Fig. 2, from the sides of said arms to the extremities of the transverse bar 26. A lever arm 29 is attached to and extends from the approximately midpoint of the transverse bar 26 and a clevis 30 is formed at the outer end thereof. A winch rope 31 is adapted to be attached to this clevis and to a drum 32, carried by a tractor or truck, upon which the rope may be wound or unwound to control the movements of the swinging frame in the loading and unloading operations of a cable reel, as will be presently described.

Wire rope slings 33, 33 may be attached at one end to the transverse bar 26 between the arms 25 and the members 28, as shown in Fig. 2. The other ends of the slings are adapted to engage the grooved ends of a spindle 34 which extends through the sides of a cable reel 35. The spindle 34 extends through spacers 40 attached to each side of the cable reel. The spacers serve to centrally position the reel on the trailer.

Locking means are provided on the supporting tracks 8, 8 near the saddle portions 7 for holding the cable reel in position on the trailer. As more clearly indicated in Fig. 3, the locking members are pivotally mounted at one end on transversely positioned bolts 37 supported in longitudinal grooves extending through the saddle members 7. The locking members 36 in their open positions will lie, as shown, in full lines, and in their closed positions will lie as shown by dotted lines in Fig. 1 of the drawings. The lip portions of the locking members in their latter positions will lie in the openings 38, and the weight of the cable reel and its supporting spindle when in position will cause the lip portions to be moved rearwardly and locked in the openings.

In the loading operation of the trailer, it is backed to a position close to the cable reel it is to carry and the free ends of the wire rope slings are placed over the grooved ends of the spindle bar which extends through the center of the cable reel, as shown in full lines in Fig. 1. The winch carried by the tractor or truck, by which the trailer is drawn, is operated in a direction to wind the wire rope connected to the swinging frame thereon. This causes the frame to be rotated toward the front of the trailer, and as it swings forward it raises the reel from the ground and carries it on the supporting tracks provided on the rear of the frame to a position on the saddle members slightly above that shown by dotted lines in Fig. 1. The lock 36 is then actuated to its closed position. The winch 32 is now operated to slightly unwind the wire rope until the ends of the spindle 34 bear against the inner sides of the lip portions of the locks 36. This causes the flanged portions of the lips to be held beneath the surfaces on either side of the restricted portions of the openings 38, thus securely keeping the lock in the closed position. The spindle carrying the cable reel is held in this position by actuating the locking members to their closed position, as formerly described. In the unloading operation of the cable reel, the reel is raised slightly, thus permitting the locking members 36 to be rotated to an open position and the cable reel is unloaded in a manner reverse to that just outlined.

What is claimed is:

1. A trailer for transporting cable reels including a main frame, said frame having tubular members forming a lower forked portion and tubular members forming an upper substantially U-shaped portion, supports connected to the upper portion, and an auxiliary frame pivotally connected with the main frame and arranged to swing in an arc between forward and rearward limits thereon to respectively load and unload cable reels on and from said supports.

2. A trailer for transporting cable reels including a main frame, said frame having tubular members forming a lower forked portion and tubular members forming an upper substantially U-shaped portion, supports connected to the upper portion, an auxiliary frame pivotally connected with the main frame and arranged to swing in an arc between forward and rearward limits thereon to respectively load and unload cable reels on and from said supports, and locking means carried by the supports for holding cable reels in loaded position on the trailer.

3. A trailer for transporting cable reels including a main frame, said frame having tubular members forming a lower forked portion and tubular members forming an upper substantially U-shaped portion, supports connected to the upper portion, an auxiliary frame arranged to swing in an arc between forward and rearward limits on the main frame to load and unload cable reels on and from said supports, said auxiliary frame including a yoke having arms each connected at one end to the main frame and having a transverse member connected to the opposite ends of said arms, and means connected to the transverse member for moving said auxiliary frame.

4. A wheeled carriage having a main frame including tubular members forming a lower forked portion and tubular members forming an upper substantially U-shaped portion, means on said upper portion to support a cable reel, an auxiliary frame pivoted at one end to said main frame and having means at the opposite end from which a cable reel may be suspended, and means to swing said auxiliary frame with the suspended cable reel into position so that the spindle of the reel will rest upon its supports on the main frame.

5. A wheeled carriage having a main frame including tubular members forming a lower forked portion and tubular members forming an upper substantially U-shaped portion, means on said upper portion to support a cable reel, an auxiliary frame pivoted at one end to said main frame and having means at the opposite end from which a cable reel may be suspended, means to swing said auxiliary frame with the suspended cable reel into position so that the spindle of the reel will rest upon its supports on the main frame, and means connected with the upper portion to guide the spindle of the reel to its supports as the auxiliary frame is swung.

6. A wheeled carriage having a main frame including tubular members forming a lower forked portion and tubular members forming an upper substantially U-shaped portion, means on said upper portion to support a cable reel, an auxiliary frame pivoted at one end to said main frame and having means at the opposite end from which a cable reel may be suspended, means to swing said auxiliary frame with the suspended cable reel into position so that the spindle of the reel will rest upon its supports on the main frame, and locking means for retaining the cable reel on the supports.

7. A wheeled carriage having a main frame including tubular members forming a lower forked portion and tubular members forming an upper substantially U-shaped portion, means on said upper portion to support a cable reel, an auxiliary frame pivoted at one end to said main frame and having means at the opposite end from which a cable reel may be suspended, means to swing said auxiliary frame with the suspended cable reel into position so that the spindle of the reel will rest upon its support on the main frame, means associated with said support to guide the spindle of the reel to the support as the auxiliary frame is swung, and locking means for retaining the cable reel on the support.

8. A trailer for transporting cable reels including a main frame, said frame having tubular members forming a lower forked portion and tubular members forming an upper substantially U-shaped portion, an auxiliary frame pivotally connected with the main frame and arranged to swing in an arc between forward and rearward limits thereon to respectively load and unload cable reels, and wheel members pivotally connected to the main frame and arranged under the weight of a loaded cable reel to rise and fall independently to compensate for irregularities in the ground surface.

In testimony whereof, we have signed our names to this specification this 21st day of March, 1931.

TEMPLE C. SMITH.
ALBERT E. FREEMAN.
WILLIAM T. LIVERMORE.